United States Patent

[11] 3,559,951

| [72] | Inventor | Marvin E. Whiteman, Jr. |
| | | Northridge, Calif. |
| [21] | Appl. No. | 734,385 |
| [22] | Filed | June 4, 1968 |
| [45] | Patented | Feb. 2, 1971 |
| [73] | Assignee | Whiteman Manufacturing Company |
| | | Pacoima, Calif. |
| | | a corporation of California |

[54] GATE VALVE FOR CEMENT AND LIKE MATERIALS
3 Claims, 6 Drawing Figs.

[52] U.S. Cl. .................................................. 251/214, 251/328
[51] Int. Cl. .................................................. F16k 3/02
[50] Field of Search.......................................... 251/328, 214, 324

[56] References Cited
UNITED STATES PATENTS

| 2,731,231 | 1/1956 | Garrott............................ | 251/328 |
| 2,942,841 | 6/1960 | Stillwagon...................... | 251/214 |
| 3,071,342 | 1/1963 | Allen................................ | 251/328X |
| 3,071,343 | 1/1963 | Milleville........................ | 251/328X |
| 3,198,123 | 8/1965 | Wilkenson..................... | 103/49 |
| 3,437,311 | 4/1969 | Schaible et al................ | 251/326X |

*Primary Examiner*—Arnold Rosenthal
*Attorney*—Whann and McManigal

ABSTRACT: A gate valve for controlling flow of abrasive materials such as cement and the like in which metal-to-metal contact is eliminated in the valving parts by providing a valve housing having a renewable or replaceable cartridge of molded or otherwise formed resilient material, the cartridge having a U-shaped internal cavity transversely of the flow axis between aligned inlet and outlet wall openings, and a sidewall opening in right-angled relation to the flow axis for endwise movement of a power actuated U-shaped valve member, the peripheral edge of which is conformed to and adapted to seat on the inner wall surface of the U-shaped cavity in the closed position of the valve. A cup seal carried by the valve member closes the space around the valve member in the side opening, when the valve member is in closed position.

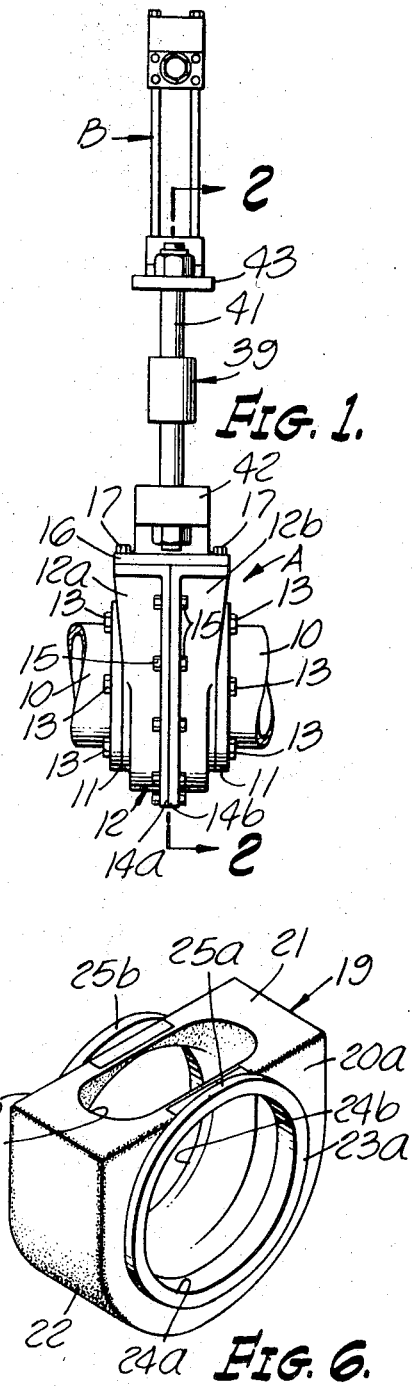
FIG. 1.
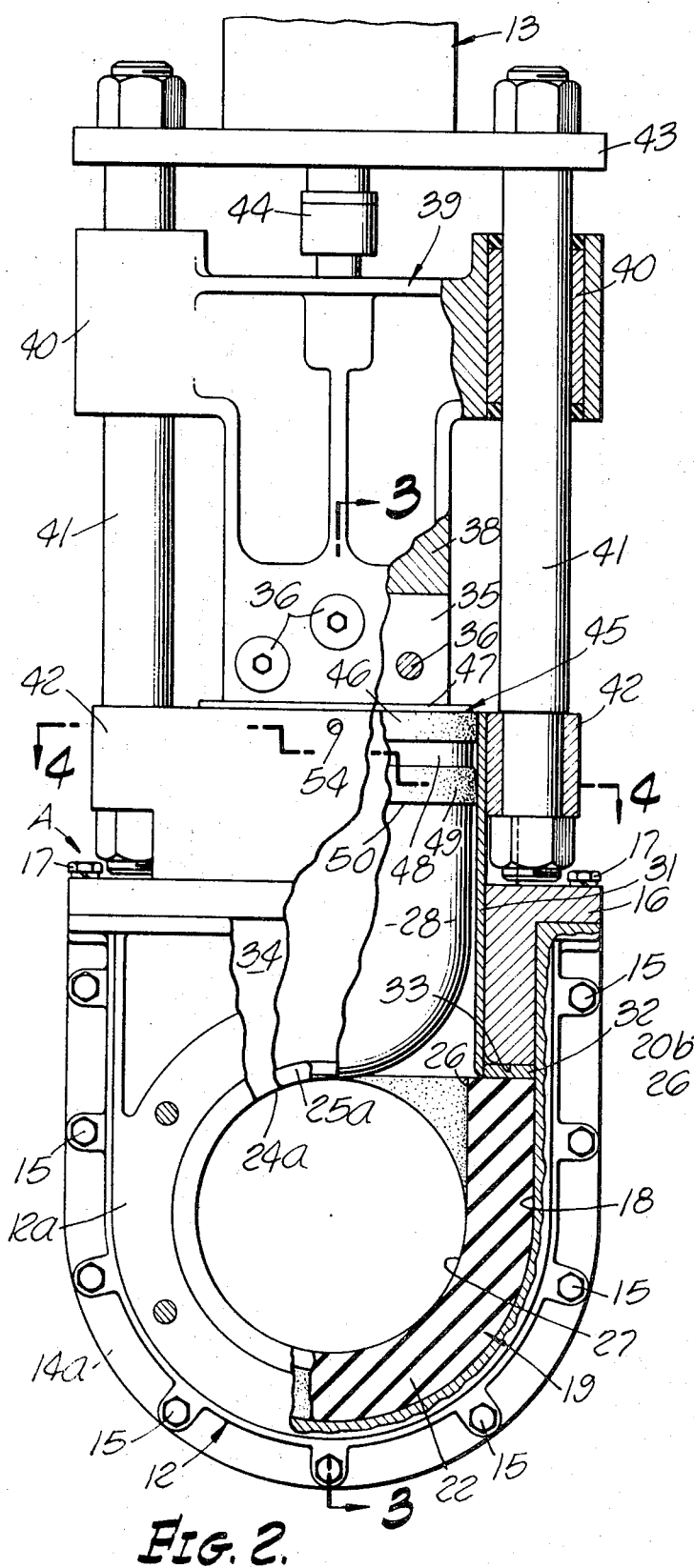
FIG. 2.
FIG. 6.
MARVIN E. WHITEMAN, JR.
INVENTOR
WHANN & McMANIGAL
Attorneys for Applicant
BY

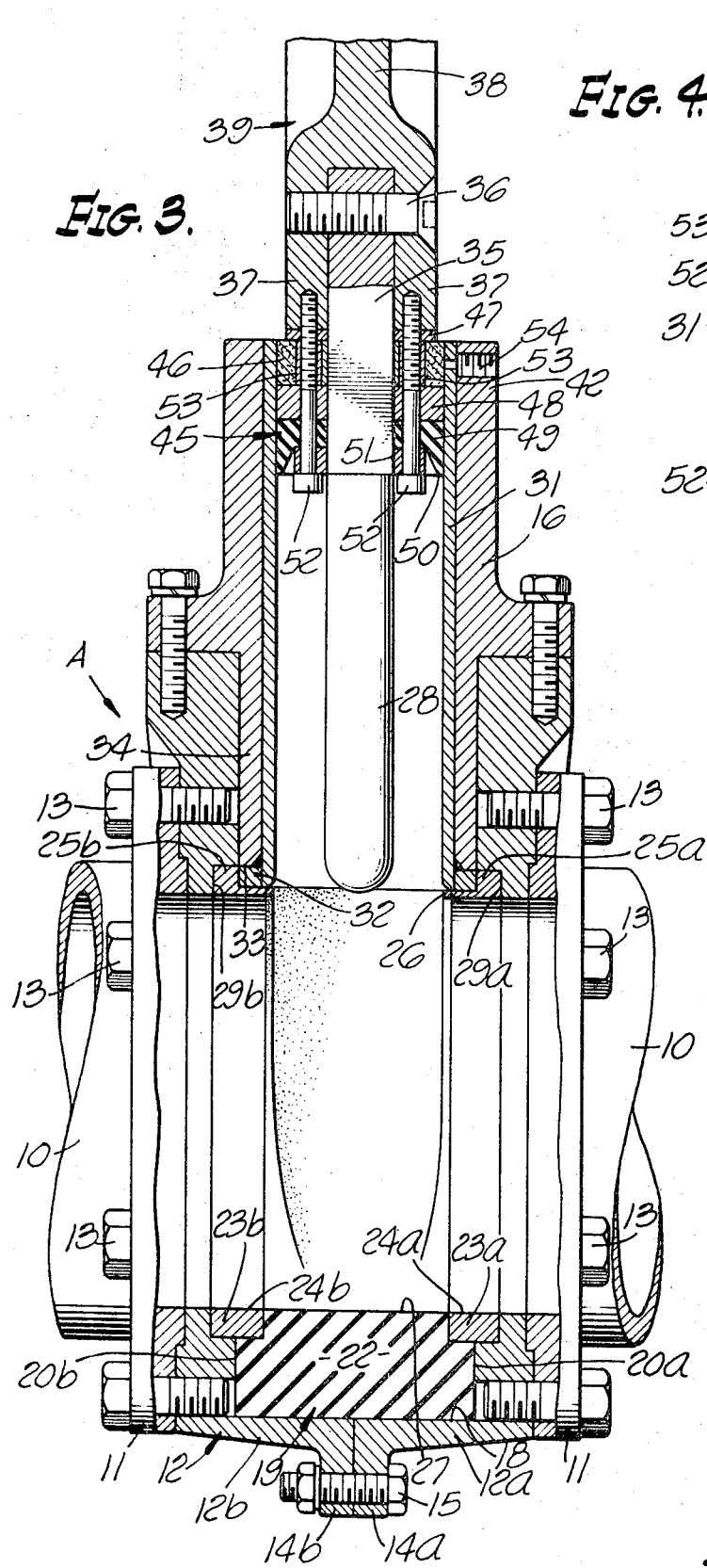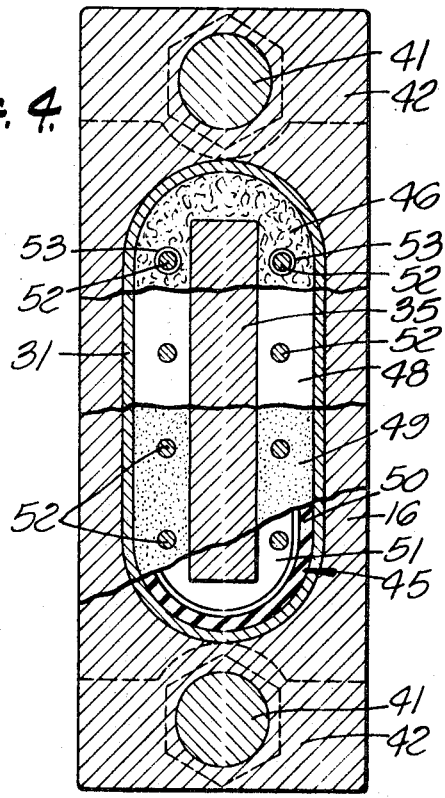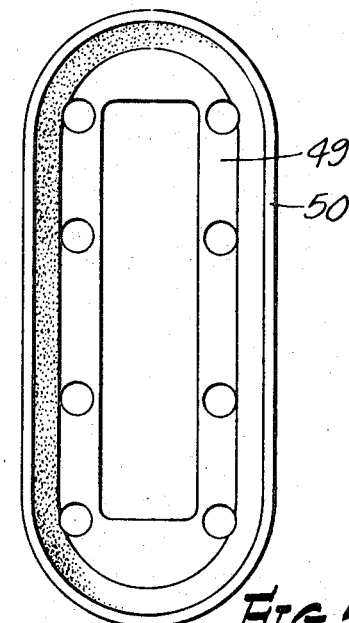

3,559,951

1

GATE VALVE FOR CEMENT AND LIKE MATERIALS

BACKGROUND OF THE INVENTION

The invention relates to the field of valves.

While valves of the type forming the subject matter of the present invention are susceptible of general use, such valves find a most desirable application in the field of pumping abrasive materials such as cement and other similar materials. Valves of this general type are illustrated, for example, in U.S. Letters Pat. No. 3,327,634 for the control of the supply of cement to pumping equipment, as well as to control the delivery of the cement from the pumping equipment to a delivery line.

Prior art valves as used for controlling the flow of cement have involved structures in which a metallic gate member is arranged to seat on a metal seating surface. Such valves, due to the metal-to-metal contact, have invariably constituted a source of trouble not only with respect to operation, but also with respect to maintenance. It has heretofore been known and appreciated that the use of metal-to-metal contact between the valving parts was conducive to rapid wear and short life of the parts. As a result, the valve parts could readily become jammed at critical times during a pumping operation, and result in loss of valuable time required to make replacements and repairs. Such repairs in the main were not easily effected in the valve structures of conventional type.

The benefits to be derived from the use of valve parts arranged to eliminate the metal-to-metal contact as in general been appreciated, and attempts have been made to provide a valve structure in which either the valve or the valve plate embodied a resilient material. For example, it is known in U.S. Letters Pat. No. 3,198,123 to provide a resilient nose portion on the valve member. However, the structure disclosed therein is quite complicated and costly of manufacture. Moreover, the resilient nose portion lacks the desired rigidity inherent in a valve member constructed entirely of metal.

The present invention overcomes the above problems of the prior art by utilizing an improved valve arrangement of simple construction in which the valve member has a rigid spade portion arranged to be operated into and out of a seated position against a resilient bumper in the form of an easily replaceable cartridge.

SUMMARY OF THE INVENTION

The present invention relates generally to valves, and is more particularly concerned with the improvement in gate valves for use in connection with the control of abrasive materials such as cement and the like.

It is one object of the present invention to provide an improved gate valve which is of simple construction, economical to build and maintain, and which is particularly suitable for the handling of abrasive materials such as cement and the like.

A further object is to provide a gate valve of the above character in which the valving parts are so arranged and constructed that metal-to-metal engagement is eliminated.

A still further object is to provide a gate valve of unique construction wherein a reciprocable valve member is provided with a novel seal and means for lubricating the valve member during movements to valve closed and valve opened positions.

It is also an object to provide a unique gate valve structure having an easily replaceable resilient cartridge which is mountable within the valve body and provides a resilient seat for the valve member, and in which metal-to-metal contact is eliminated.

It is another object to provide a unique cartridge insert for a gate valve, which is susceptible of manufacture and sale as a unique article of manufacture.

Still another object is to provide a gate valve of universal character which may be mounted in a flow line in reversible end-for-end relation without changing the valve operation.

The foregoing and other objects, features and advantages of the invention will be presented in the following part of the specification, wherein detailed description is for the purpose of fully disclosing the invention without placing limitations thereon.

BRIEF DESCRIPTION OF THE DRAWINGS

Referring to the accompanying drawings, which are for illustrative purposes only:

FIG. 1 is a side elevational view of a valve incorporating the features of the present invention, mounted in a connected flow line;

FIG. 2 is an enlarged fragmentary view having cutaway portions and other portions in section taken substantially on line 2—2 of FIG. 1.

FIG. 3 is a sectional view through the same taken substantially on line 3—3 of FIG. 2;

FIG. 4 is an enlarged transverse sectional view taken substantially on line 4—4 of FIG. 2 and showing details of construction of the sealing means for the valve member;

FIG. 5 is a detailed view showing the seal cup member as it appears when looking toward the underside; and FIG. 6 is a perspective view showing details of construction of the cartridge insert as embodied in the valve of the present invention.

DESCRIPTION OF THE PREFERRED EMBODIMENT

Referring more specifically to the drawings, the present invention for illustrative purposes is shown in FIG. 1 as comprising a gate valve A having a mechanically coupled fluid power actuator B, the gate valve being installed in a flow line 10 by means of attaching flanges 11—11 which are secured to the opposite ends of the valve housing as generally indicated at 12 by means of bolts 13.

The housing 12 is symmetrically constructed so as to permit the valve to be installed indiscriminately in end-for-end relation without affecting the operation. As seen in FIG. 1, the housing 12 forms a valve body composed of mating sections 12a and 12b which are secured together along engaged confronting flanges 14a and 14b by means of bolt 15. At the top of the connected sections there is provided a cap section 16 which is retained in position by means of a plurality of bolts 17.

The sections 12a and 12b and 16 cooperate to form the valve body and provide a generally U-shaped internal cavity 18 adapted to removably receive therein a cartridge unit as generally indicated by the numeral 19 in FIG. 6.

The cartridge unit 19 is also U-shaped and constructed by molding or otherwise forming a resilient material such as polyurethane, or other appropriate material. More specifically, the unit is of hollow construction and comprises axially spaced end walls 20a and 20b in parallel relation and separated by a sidewall made up of a flat section 21 and a generally U-shaped section 22 having its ends respectively connecting with the ends of the flat section. The sidewalls have steel ring inserts 23a and 23b respectively which axially project beyond the associated sidewall and define axial openings 24a and 24b therein. The ring inserts in each case have an arcuate portion 25a and 25b of reduced width which project above the plane of the flat wall section 21. The flat section 21 contains an elongate opening 26 which provides an entrance to the interior of the cartridge, this entrance being in right angled relation to the axis of the end wall openings. As thus arranged, the cartridge unit defines a generally U-shaped internal cavity 27 for the endwise reception and retraction of a U-shaped spade valve member 28 through the opening 26 in a manner which will hereinafter be further described in detail.

As best shown in FIGS. 2 and 3, the cartridge unit 19 is positioned within the U-shaped cavity 18 of the housing, the steel ring inserts 23a and 23b extending into and being seated in annular grooves 29a and 29b respectively formed in the housing sections 12a and 12b. As thus mounted, the cartridge openings 24a and 24b are axially aligned with the flow axis through the valve housing as established by the flow line 10. The elongate opening 26 is arranged to register with a similarly conformed interior passage 30 of an elongate sleeve member 31 positioned within the cap section 16. The inner end of the sleeve member 31 is secured as by welding to a seating plate 32 which is clamped into surface engagement between the flat section 21 of the cartridge unit and an inner end surface 33 provided on an inwardly extending tubular extension 34 of the cap section. As thus arranged, the sleeve member 31 provides a passage for reciprocable movement of the spade valve member 28.

As best shown in FIG. 2, the spade valve member 28 is fabricated with a shank end 35 which is secured as by a plurality of bolts 36 between the branch legs 37–37 (FIG. 3) at the bifurcate inner end of an arm extension 38 of a guide yoke 39. This guide yoke is provided at its ends with guide bearings 40–40 respectively operably movable on guide rods 41–41. These guide rods at their lowermost ends are anchored in an outwardly extending projection 42 of the cap section 16. At their outermost ends, the guide rods are secured to a transversely extending bracket 43 which is arranged to support the fluid power actuator B in a conventional manner with its power delivery element connected through a suitable coupling 44 to the guide yoke. As thus arranged, the fluid power actuator may be selectively energized to move the valve member 28 into valve closed and valve opened position in the U-shaped internal cavity of the cartridge unit 19 within the valve housing. Since the valve member is of metal, and the cartridge unit is constructed of a resilient material, metal-to-metal contact is eliminate. As will be seen, the end configuration of the valve member 28 is U-shaped so as to conform to the internal cavity 27 of the cartridge unit.

As will be seen in FIGS. 2 and 3, the valve member 28 has its outer surface in spaced relation to the innner wall of the sleeve member 31, and that in order to prevent the passage of cement from the interior of the cartridge unit outwardly past the valve member in the space within the sleeve 31, it becomes necessary to provide appropriate sealing means, which will now be described. For such purpose there is provided a sealing and lubricating assembly as generally indicated at 45. The components of this assembly are peripherally of oblong configuration to fit within the transverse oblong configuration of the passage within the sleeve 31. Adjacent the inner ends of the branch legs 37–37, there is provided a wiper member 46 of a suitable material such as felt, a spacer plate 47 being interposed between the wiper member and the adjacent end surfaces of the branch legs 37–37. On the opposite side of the wiper member there is provided a backup plate 48 of brass or other suitable material. Next to the backup plate, there is provided a seal cup member 49 of polyurethane or other suitable material, this seal member having a peripheral axially extending lip 50 which is positioned so as to extend inwardly towards the cartridge unit and the elongate opening 26 therein. Lastly, there is provided a cup retaining plate 51 of brass or other suitable metal. The above noted components of the lubricating and sealing assembly are retained in superposed stacked relation by means of a plurality of cap screws 52 which extend through the various components and are threadedly engaged at their outer ends in tapped holes in the ends of the branch legs 37–37. The passages through the wiper member 46 may be provided with sleeve liners 53, if desired. As thus mounted, the lubricating and sealing assembly 45 will be moved with the spade valve member 28 as it is actuated to valve closed and valve opened positions. During this movement, the seal cup member 49 serves to seal the space lying between the periphery of the valve member 28 and the inner wall surface of the sleeve 31, and in the valve closed position will form a seal adjacent the elongate opening 26 of the cartridge unit.

As shown in FIG. 2, an oil hole 54 is provided in the wall of the outwardly extending projection 42 at the position of the wiper member 46. It is thus possible to maintain the wiper member saturated with oil which will lubricate the inner wall of the sleeve 31 during the operating movements of the valve member 28.

With the construction described above, it will be evident that the cartridge unit 19 may readily be replaced by a comparatively simple disassembly of the mating housing sections 12a and 12b from the cap section 16, after which the housing sections 12a and 12b may be separated by removal of the flange bolts 15. Separation of these two housing sections permits ready and easy removal of the cartridge and replacement by a new cartridge, when needed.

From the foregoing description and drawings it will be clearly evident that the delineated objects and features of the invention will be accomplished.

Various modifications may suggest themselves to those skilled in the art without departing from the spirit of my invention, and hence, I do not wish to be restricted to the specific forms shown or uses mentioned, except to the extent indicated in the appended claims.

I claim:

1. A gate valve for cement and other abrasive materials, comprising:
   a. a hollow housing having a material flow path therethrough, said path connecting with axially aligned inlet and outlet openings respectively on opposite sides of the housing;
   b. valve means including a spade member supported for movement into and out of a valve closed seated position extending transversely of said flow path;
   c. nonmetallic means engageable with the seated part of said spade member in said closed position, including a replaceable cartridge liner member for said housing, which comprises a hollow structure with opposed wall openings axially alignable in said flow path, and a side opening in right-angled relation to said flow path axis for the passage of said spade member during movement into and out of said position;
   d. an elongate sleeve extending axially from said side opening;
   e. a cuplike seal member carried by said spade member peripherally conforming to the transverse inner wall surface of said sleeve, said cuplike member operating to seal the spade member with respect to said sleeve during movement and provide a seal at said side opening in the seated position of said spade member; and
   f. power means selectively energizable to move said spade member into and out of said position.

2. A gate valve according to claim 1, wherein the inner end of said sleeve has a peripheral abutment flange engaged with an outer wall surface of the cartridge around said side opening.

3. A gate valve for cement and other abrasive materials comprising:
   a hollow housing having a material flow path therethrough, said path connecting with axially aligned inlet and outlet openings respectively on opposite sides of the housing;
   the housing having an upper part and a lower part, valve means including a U-shaped spade member having opposed side faces, said spade member being supported for movement into and out of valved closed seated position extending transversely of said flow path;
   a nonmetallic replaceable cartridge liner in the lower part of the housing comprising a hollow U-shaped structure of a width and height to fit within the lower part of the housing and in the flow path through the housing, the U-shaped structure having opposed end walls and a sidewall between and connected to the end walls, openings in each of the end walls in alignment with the inlet and outlet openings in the housing, the sidewall being the base and legs of the U-shape, the sidewall having on its inner face the valve engaging surface to engage and seal the spade member in seated position, a second sidewall extending across and connecting the ends of the first mentioned sidewall and having an elongated opening therein, the axis of the opening being perpendicular to the axis of the flow path through the housing, the opening in the second sidewall being of a length to allow the spade member to pass therethrough to seating position;

ring inserts in the first sidewall openings and extending into the inlet and outlet openings in the housing;

the spade member being completely withdrawn from the cartridge when in full open position and in the upper part of the housing in such position, the spade member having a cuplike seal member mounted thereon adjacent an upper end, the seal engaging the second sidewall of the cartridge when the spade member is in closed position, and conforming to the inner wall of the upper part of the housing to seal the housing during open position; and power means selectively energizable to move the spade member into and out of closing position.